6842X
L. WERNWAG.
Car Truck.
Patented Nov. 16, 1831.
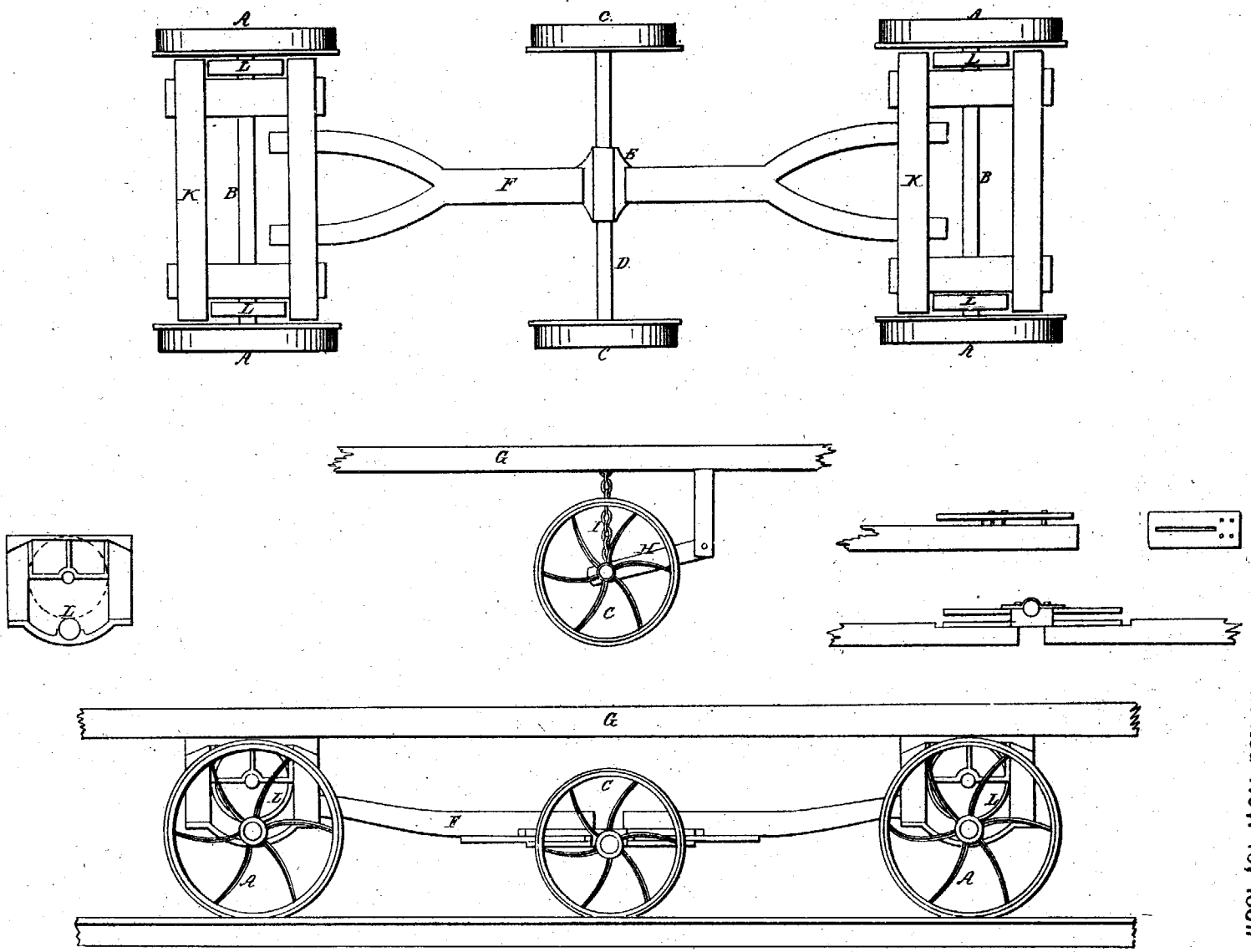

Lewis Wernwag Harpersferry Virginia

Letters Patent 6842X

The Schedule referred to in these Letters Patent and making part of the
same containing a description in the words of the said Lewis Wernwag
himself of his improvement called Wernwags self regulating or self
directing Rail Road Car Be it known that I Lewis Wernwag of Harpersferry County of Jef
ferson and State of Virginia have made improvement being a self regulating
or self directing Rail Road Car which is described as follows. This Rail
Road car consists of the following parts. 1 The flange wheels with their
axles. 2 the hounds and guiding pole. 3 the frame on which the
carriage is placed. 4 The friction wheels or rollers.
1. The flange wheels with their axles - Four of the flange wheels are
made in the usual form, but without a cone. Two light wheels called
regulating wheels are placed in the centre of the carriage; on an axle
about 1/2 an inch or 3/4" of an inch between the flanges or shoulders of
the axle longer than the axles of the main wheels: this is done to make
the regulating wheels act quicker. One of the regulating wheels as well
as one of the main wheels is made stationary and the other revolves
on the axle, to accommodate themselves to the curve. on the regulating
axle are one or two flanges projecting from the body of the axle tree in the
centre about 3/4ths of an inch embraced by a metal box made in halves
in the form of a T both ways from the centre, and screwed together
so as to let the axle tree revolve freely and hold oil. On the axle if
thought proper might be made stationary and both the wheels made
to revolve. The main axles are made as usual, but the regulating axle
must be made quite light. On the frame are suspended two sliding
boxes in which the regulating axle turns they are made to slide up
and down so as to prevent the flanges from being injured by any inequal
ities in the Railroad. The boxes of the main axles are supported and the axles turn the usual way – 2 The Hounds and guiding Pole
These are made as usual in a common waggon. The coupling or guiding
pole is made in two equal parts. and secured by little bolts to the box
before mentioned in an oblong mortice or mortices with holes in the
same size in the T about 1/2 inch apart to admit of a bolt
for determining the quickness or slowness of the power for regulating
the carriage in the curve according to the desire of the conductor of the car
riage – 3. The frame on which the carriage is placed. This may
be made curved or straight in the usual mode and of any convenient
length. On the [illegible] side of this frame is hung a lever with a moveable joint
the lever to be of any convenient length and strength. On the end of this
lever is a metal box. which embraces the middle axle tree at each
end in which it moves or slides endways and will keep the main
axles in a proper position for forming the sweep. The box embra
cing the end of the axle tree may be hung with a chain from the frame
so that the regulating wheels may be stationary in a straight line. and the
flange only touch the iron rail when it is required to move in a curve
4. The friction wheels or rollers. Two small friction wheels are placed
at each end of the carriage under the bolster to make the regulating
part more easy. Any kind of friction rollers for the main axles to turn
in may be used at pleasure – Operation – When the Rail Road is straight
then the wheels all move parallel to each other. but when the carriage comes
to move in a curve the flange of the regulating wheel comes in contact
with the iron rail and instantly shoves the centre of the guiding pole out of
a straight line. and then directs the fore and hind axle trees and keeps
them to the centre of the radius of the sweep of the curve. thus moving
the carriage in its course without any additional power. and without
any injury to the rails. As the wheels can be placed at any required distance
apart and the carriages made of any length. long [illegible] or any num
ber of passengers can be moved without inconvenience.
What I claim as my invention and wish to be secured by letters Patent is the
before described method of making Rail Road carriages with self-regulating
or self-directing wheels and axles However applied. The before described principle for guiding Rail Road carriages may also be applied to Locomotive Engines on Mc Adamised and other Roads by means of Rack on Pinion Pulley and cord, or by any other means adapted to the purpose
For a further illustration of my invention I refer to the model and drawings of the same deposited in the Patent Office. In testimony whereof I have hereunto subscribed my name before two witnesses at the City of Washington this 10th day of November 1831

Witnesses
William H. Elliot
Chs. M. Keller

Lewis Wernwag

Ex.d
Chs. M.